US009588726B2

(12) United States Patent
Webb et al.

(10) Patent No.: US 9,588,726 B2
(45) Date of Patent: Mar. 7, 2017

(54) THREE-DIMENSIONAL OBJECT STORAGE, CUSTOMIZATION, AND DISTRIBUTION SYSTEM

(71) Applicant: Accenture Global Services Limited, Dublin (IE)

(72) Inventors: Sunny Webb, San Francisco, CA (US); Kelly L. Dempski, Redwood City, CA (US); Matthew Short, San Jose, CA (US); Michael Balint, San Jose, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/162,423

(22) Filed: Jan. 23, 2014

(65) Prior Publication Data

US 2015/0205544 A1    Jul. 23, 2015

(51) Int. Cl.
*G06F 3/12* (2006.01)
*G06T 7/60* (2006.01)
*G06K 15/02* (2006.01)
*G06Q 10/00* (2012.01)

(52) U.S. Cl.
CPC ............ *G06F 3/126* (2013.01); *G06F 3/1203* (2013.01); *G06F 3/1222* (2013.01); *G06Q 10/00* (2013.01); *G06T 7/602* (2013.01); *G06T 2200/04* (2013.01); *G06T 2207/10012* (2013.01)

(58) Field of Classification Search
None
See application file for complete search history.

(56) References Cited

U.S. PATENT DOCUMENTS

| | | | |
|---|---|---|---|
| 6,621,589 B1 | 9/2003 | Al-Kazily et al. | |
| 6,687,018 B1 | 2/2004 | Leong et al. | |
| 7,088,462 B2 | 8/2006 | Bhogal et al. | |
| 7,689,966 B2 | 3/2010 | Verma et al. | |
| 8,065,741 B1* | 11/2011 | Coblentz et al. | 726/27 |
| 2003/0046122 A1 | 3/2003 | Seymour | |
| 2005/0030574 A1 | 2/2005 | McVey et al. | |
| 2005/0114672 A1* | 5/2005 | Duncan et al. | 713/182 |
| 2007/0229896 A1* | 10/2007 | Fujimori et al. | 358/1.16 |

(Continued)

FOREIGN PATENT DOCUMENTS

| | | | | |
|---|---|---|---|---|
| JP | 2007072831 | | 3/2007 | |
| WO | WO 2012/146943 | * | 11/2012 | ............. B29C 67/00 |

(Continued)

OTHER PUBLICATIONS

European Search Report EP 15152285, dated Apr. 23, 2015.

(Continued)

*Primary Examiner* — Beniyam Menberu
(74) *Attorney, Agent, or Firm* — Brinks Gilson & Lione

(57) ABSTRACT

A method for routing object data that defines a 3-dimensional (3D) object to a 3D printer includes receiving the object data at a server and determining, by the server, object attributes associated with the object defined by the object data. The server searches a database that stores 3D printer attributes for one or more 3D printers capable of printing objects that possess the determined object attributes. If one or more capable printers are identified, the server communicates a list that identifies the one or more capable printers to a user.

15 Claims, 8 Drawing Sheets

(56) References Cited

U.S. PATENT DOCUMENTS

| | | | |
|---|---|---|---|
| 2008/0028323 A1 | 1/2008 | Rosen et al. | |
| 2008/0151288 A1* | 6/2008 | Matsunoshita | 358/1.15 |
| 2009/0284527 A1* | 11/2009 | Ofek et al. | 345/420 |
| 2009/0319529 A1* | 12/2009 | Bartlett et al. | 707/9 |
| 2012/0092724 A1 | 4/2012 | Pettis | |
| 2012/0105903 A1* | 5/2012 | Pettis | 358/1.14 |
| 2012/0326356 A1* | 12/2012 | Martin | G03B 21/62 264/401 |
| 2013/0124151 A1 | 5/2013 | Mech et al. | |
| 2013/0176312 A1* | 7/2013 | Schouwenburg | G06K 15/025 345/424 |
| 2013/0297320 A1* | 11/2013 | Buser | B29C 67/0055 704/275 |
| 2013/0329258 A1* | 12/2013 | Pettis | F16M 13/022 358/1.15 |
| 2014/0058959 A1 | 2/2014 | Isbjornssund et al. | |
| 2014/0122544 A1* | 5/2014 | Tran et al. | 707/825 |
| 2014/0156053 A1* | 6/2014 | Mahdavi et al. | 700/119 |
| 2014/0288699 A1* | 9/2014 | Williams | B29C 67/0085 700/233 |
| 2014/0309765 A1 | 10/2014 | Blanchfield | |
| 2015/0021830 A1* | 1/2015 | Yerazunis | B29C 67/0085 264/401 |
| 2015/0057784 A1* | 2/2015 | Butler et al. | 700/119 |
| 2015/0112644 A1* | 4/2015 | Schmidt | 703/1 |
| 2015/0120806 A1* | 4/2015 | Lippincott | 709/203 |
| 2015/0142153 A1* | 5/2015 | Chun | B29C 67/0088 700/98 |
| 2015/0151492 A1* | 6/2015 | Schmidt | B29C 67/0088 700/98 |
| 2016/0107234 A1* | 4/2016 | Craeghs | B29C 67/0077 419/53 |

FOREIGN PATENT DOCUMENTS

| | | |
|---|---|---|
| WO | 2013013146 A1 | 1/2013 |
| WO | 2015116336 | 8/2015 |

OTHER PUBLICATIONS

Examination Report for Australian Application 2015200280, issued Feb. 13, 2015.

Print to 3D, URL: http://web.archive.org/web/20150111233142/http://www.printo3d.com/ published on Jan. 8, 2015.

3D Model Repositories, Url: https://web.archive.org/web/20150202205657/http://3dprintingforbeginners.com/3d-model-repositories/, published on Feb. 2, 2015.

\* cited by examiner

THREE-DIMENSIONAL OBJECT STORAGE, CUSTOMIZATION, AND DISTRIBUTION SYSTEM

BACKGROUND

Field

This application relates to 3D printing. In particular, this application describes a system that facilities three-dimensional object storage, customization, and distribution.

Description of Related Art

Three-dimensional (3D) printing is a process of making a three-dimensional solid object of virtually any shape from a digital model. 3D printing is achieved using an additive process, where successive layers of material are laid down in different shapes.

In the last decade, the cost of 3D printers has dropped dramatically, making 3D printing widely available. The variety in the types of 3D printers and their capabilities has also increased. For example, a variety of layering technologies are employed by different printers, such as extrusion, wire, and granular to name a few. Some materials utilized by 3D printers include thermoplastics, metal alloys, plaster, and paper. Some printers are capable of printing relatively large objects, while others are capable of printing objects with complex geometries.

A typical workflow for printing a 3D model begins with a designer in a design house creating a digital model of an object using computer aided design (CAD) software. Once the model is ready, the designer initiates a print operation to print the design to a 3D printer that is connected to the CAD system.

The design house may have any number of designers working on models and any number of 3D printers available for printing. However, certain models may only be printable on certain 3D printers. Thus, a designer may have to transfer the model files to a computer to which a 3D printer capable of printing the model is attached.

BRIEF SUMMARY

Methods, systems, and computer-readable media are provided that facilitate three-dimensional object storage, customization, and distribution.

In one aspect, a method for routing object data that defines a three-dimensional (3D) object to a 3D printer includes receiving the object data at a server and determining, by the server, object attributes associated with the object defined by the object data. The server searches a database that stores 3D printer attributes for one or more 3D printers capable of printing objects that possess the determined object attributes. If one or more capable printers are identified, the server communicates a list that identifies the one or more capable printers to a user.

In a second aspect, a method for determining a uniqueness of a three-dimensional (3D) object includes receiving, at a server, object data that defines the 3D object, and determining, by the server, object attributes associated with the 3D object from the object data. The server compares the object attributes of the 3D object with object attributes associated with different 3D objects and generates a score that defines a relatedness between the object attributes associated the 3D object and the object attributes associated with the different 3D objects. If the score exceeds a predetermined threshold, the server determines that the 3D object is not unique.

In a third aspect, a system for routing object data that defines a three-dimensional (3D) object to a 3D printer includes a server configured to receive the object data and a printability indexer. The printability indexer is configured to determine object attributes associated with the 3D object defined by the object data, and to search a database that stores 3D printer attributes for one or more 3D printers capable of printing objects that possess the determined object attributes. The server is further configured to communicate a list that identifies one or more capable 3D printers to a user when the printability indexer identifies one or more capable printers.

In a fourth aspect, a non-transitory machine-readable storage medium is provided that has a computer program stored thereon. The program has at least one code section for routing object data that defines a three-dimensional (3D) object to a 3D printer. The code section is executable by a machine and causes the machine to receive object data, determine object attributes associated with the 3D object defined by the object data, search a database that stores 3D printer attributes for one or more 3D printers capable of printing objects that possess the determined object attributes. If one or more capable printers are identified, the code causes the machine to communicate a list that identifies the one or more capable 3D printers to a user.

DETAILED DESCRIPTION

The embodiments described below overcome the problems above by providing a networked system that is capable of effortlessly routing a 3D object model to one or more 3D printers capable of printing the 3D model.

Figure 1:
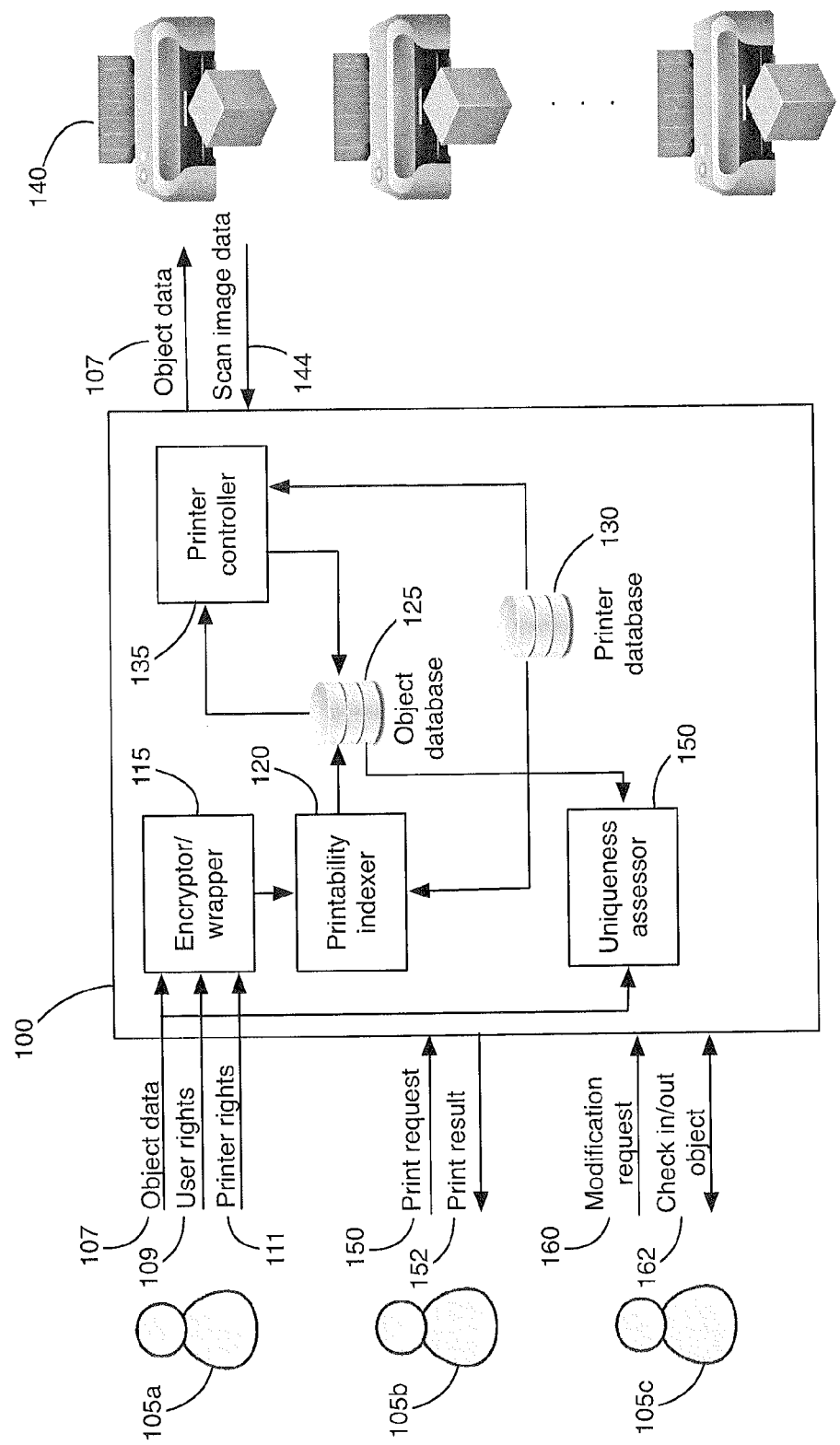
FIG. 1 illustrates an exemplary system for routing object data that defines a 3D object to a 3D printer.

FIG. 1 illustrates an exemplary system 100 for routing object data 107 that defines a three-dimensional (3D) object to a 3D printer 140. The system 100 includes an encryptor/file wrapper 114, a printability indexer 120, a printer controller 135, an object database 125, and a printer database 130. Generally, users 105 interact with the system to upload object data 107, modify the object data 107, and print an object defined by the object data 107 on printers 140 capable of printing the object.

The system 100 may reside in the cloud. That is, the system 100 may correspond to a computer system with server capabilities that is connected to the Internet. The modules of the system 100 may also reside on different computer systems that are networked together to facilitate performance of the functions performed by the system 100. In this regard, the computer systems may include one or more network interfaces that facilitate communications via a network. Each computer system may correspond to an Intel®, AMD®, or PowerPC® based computer or a different computer. The computer systems may include an operating system, such as, a Microsoft Windows®, Linux, Unix® or other operating system.

To facilitate user interaction with the system 100, the system 100 may include a web server (not shown) that generates web pages that allow users 105 to interact with the system 100. For example, the web server may generate one or more web pages that facilitate uploading object data 107 that defines a 3D object along with various rights that control access to the object data 107. Web pages that facilitate visualization, modification, and printing of the object defined by the object data 107 may also be provided.

As noted above, the system 100 is configured to communicate object data 107 to one or more printers 140. A given printer 140 may, for example, reside within the same office or building as the system 100, or within the facility in which the user 105a that uploaded the original object data 107 resides. In other instances, the printer 140 may be provided by a third-party service. In this case, the system 100 may be configured to follow network protocol procedures that may be in place that facilitate the transfer of object data 107 to the third-party service. For example, the system 100 may be configured to specify a user name, password, etc., that facilitates access to the printers of the third party.

Figure 2:
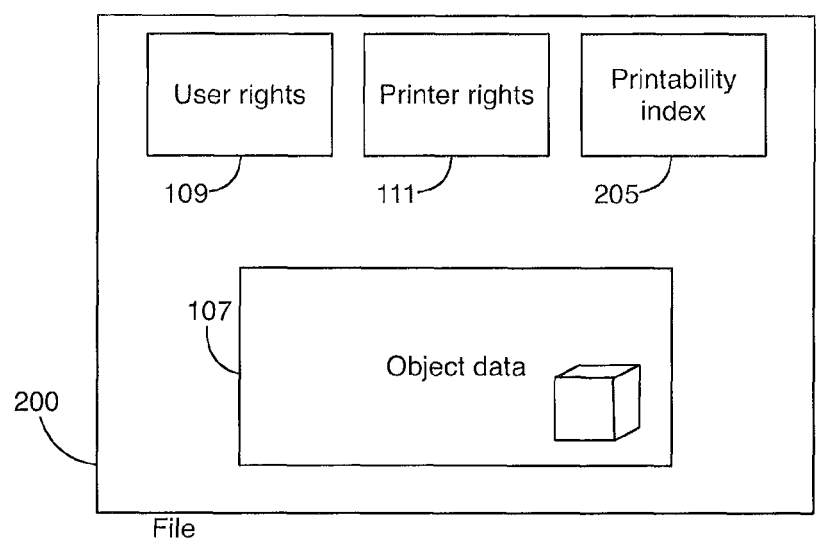
FIG. 2 illustrates an exemplary representation of a file that may wrap the object data.

Turning to the system 100, the encryptor/wrapper 115 includes code, logic, or other circuitry that facilitates encrypting the object data 107 received from a first user 105a and wrapping the encrypted object data 107 within a file wrapper or file 200 (see FIG. 2). For example, an encryption algorithm such as AES, TKDW, or AKW, may be utilized to encrypt the object data 107.

The encryptor/wrapper 115 may associate a default set of access rights and/or a custom set of access rights with the object data 107. For example, the first user 105a may have specified user rights 109 and printer rights 111 that define the access rights to the object data 107. The encryptor/wrapper 115 may embed the user rights 109 and printer rights 111 within the file 200 as metadata.

User rights 109 may be specified by the first user 105a to control access to the object data 107 by other users 105bc. For example, the user rights 109 may define other user's 105bc ability to read, modify, and distribute the object data. The user rights 109 may define printers to which other users 105bc may source the object data 107.

The printer rights 111 may be specified by the first user 105a to control access to the object data 107 by printers 140. For example the printer rights 111 may define an ability by a printer 140 to access the object data 107, a definition of printers upon which the object defined by the object data 107 can be printed, a set duration or time that defines a time at which access to the object data will expire, and a limit as to the number of print attempts that can be performed with respect to the object data 107. Other user and printer rights may be specified.

The printability indexer 120 includes code, logic, or other circuitry that facilitates determining one or more printers 140 on which a given object may be printed. The printability indexer 120 is configured to determine object attributes such as the dimensions of the object, the structural integrity of the object, and the material requirements of the object. Determination of these attributes is discussed in more detail below.

In some implementations, the printability indexer 120 may embed data that defines the dimensional, structural, and material attributes into the file 200 that stores the object data 107. After indexing, the file 200 may be stored in the object database 125 for later printing and/or modification. In alternative implementations, the data may be stored elsewhere. For example, the data may be stored in a record of a database or in a different file. In yet other alternative implementations, the printability indexer 120 may communicate the determined information to the encryptor/wrapper 115, which may then embed the attributes into the file 200 and store the file 200 to the object database 125.

The printability indexer 120 is further configured to identify printers capable of printing objects that posses the attributes determined above. In this regard, the printability indexer 120 may search the printer database 130 for capable printers. The printer database 130 stores printer attribute data associated with one or more printers 140. For example, the printer attributes may include the location and type of printer 140. The printer attributes may specify the minimum and maximum size of objects that may be printed on a printer 140. The attributes may define the types of materials the printer 140 utilizes for printing objects along with the current material quantity on hand. Other printer attributes may be associated with the printers 140.

As noted above, the object database 125 stores one or more files that store the object data, user rights, printer rights, and printability index. Storage of the object data facilitates printing of the object data at a later time and/or modification of the object defined by the object data, which is described in greater detail below.

The printer controller 135 includes code, logic, or other circuitry that facilitates routing object data 107 to one or more printers 140 for printing of an object. The printer controller 135 obtains the object data 107 from the object database 125. The printer controller 135 is configured to determine whether a given printer 140 is allowed to access the object data 107. In this regard, the printer controller 135 may prohibit access to the object data 107 if one or more of the printer rights 111 are violated. For example, the printer controller 135 may deny access after a certain number of attempts have been made to print the object. The printer controller 135 may deny access if the period for access to the object data 107 has expired. The printer controller 135 may deny access if the printer 140 is not capable of printing the object.

If access to the object data 107 is allowed, the printer controller 135 communicates the object data 107 to the printer 142. In this regard, in some implementations the printer controller 135 may include code, logic, or other circuitry that facilitates decryption of the object data 107 and communication of the decrypted object data 107 to the printer 140. In other instances, the printer 140 may include the decryption logic, in which case a pre-shared decryption key may be provided to the printer 140 ahead of time, or by the printer controller 135 after access to the object data 107 has been allowed.

Operations of the system 100 are described with reference to the block diagrams illustrated on FIGS. 3-7. Some or all of the operations may be implemented via instruction code that resides on non-transitory computer readable storage media of a computer system. Execution of the instruction code by the computer system may cause the computer system to perform the operations described in the block diagrams.

Figure 3:
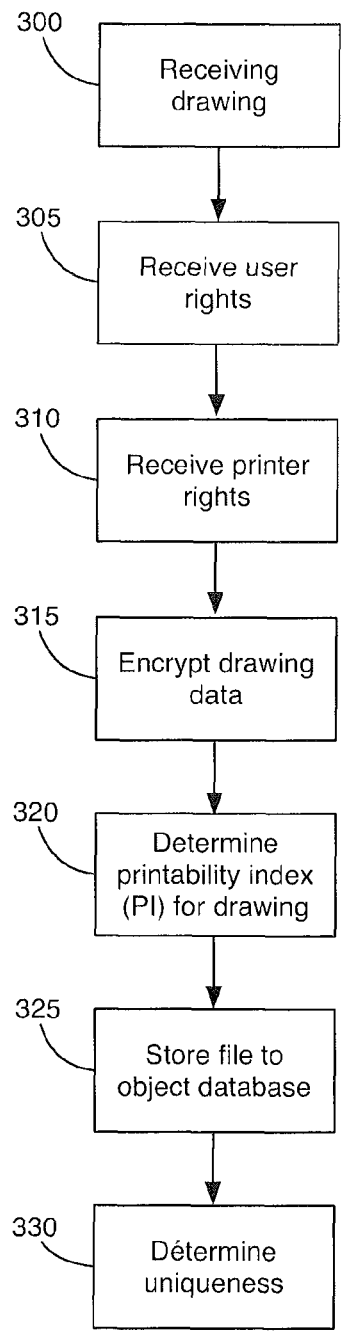
FIG. 3 illustrates a block diagram of operations that may be performed when uploading object data to the system of FIG. 1.

FIG. 3 illustrates a block diagram of operations that may be performed when initially uploading object data 107 to the system 100. At block 300, the system 100 may receive the object data 107. For example, the system 100 may provide a web page that facilitates uploading the object data to the system 100. A first user 105a may login to the system 100, select an upload option, and then initiate an upload operation.

At block 305, user rights 109 may be received. For example, a web page that identifies various user right options may be communicated to the first user 105a. The first user 105a may then specify user rights, such as identification information that identifies users that should have access to the object data 107. The type of access provided for each user may be specified. For example, rights that define whether the user can modify, print, and/or distribute the object data 107 may be specified. Other user rights 109 may be specified.

At block 310, printer rights 111 may be received. For example, a web page that identifies various printer right options may be communicated to the first user 105a. Printer right information communicated to the system 100 may define an ability by a printer 140 to access the object data 107, a definition of printers 140 upon which the object can be printed, a set duration or time that defines a time at which access to the object data 107 will expire, and a limit as to the number of print attempts that may be performed with respect to the object data 107.

At block 315, the object data 107 may be wrapped within a file 200 and encrypted using an encryption algorithm, such as AES, TKDW, or AKW. Data that defines the user rights 109 and printer rights 111 may be embedded into the file 200.

At block 320, the printability index of the object defined by the object data 107 may be determined. Determination of the printability index is best understood with reference to FIG. 4.

Figure 4:
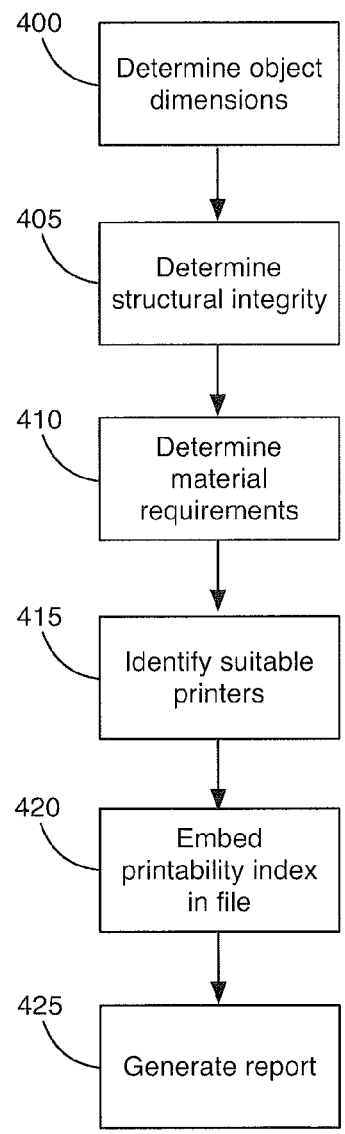
FIG. 4 illustrates a group of exemplary operations that facilitate determination of a printability index of a 3D object associated with the object data.

Turning to FIG. 4, at block 400 the dimensions of the object defined by the object data 107 may be determined. The dimensions of the object may correspond to the bounds of the object. That is, the smallest bounding cube within which the printed object will fit. The bounding volume may be determined by analyzing the coordinates of the various primitives in the object data 107 to determine the extents of the object defined by the object data 107.

At block 405, the structural integrity of the object defined by the object data 107 is determined. The structural integrity of the object may correspond to a score that represents how structurally stable the object is. In determining the score, the object data 107 is analyzed to determine the weakest points of the object, such as those locations that are the thinnest. Other aspects, such as the angles at which surfaces converge may be taken into consideration.

At block 410, the material requirements of the object defined by the object data 107 are determined. The material requirements may specify the type and quantity of material required to print the object. The first user 105a may have previously specified the type of material. Alternatively, a choice of materials may be available, in which case the printability indexer may determine the materials that are most suitable for printing of the object.

At block 415, printers 140 capable of printing objects that possess the attributes determined above are identified. For example, the printability indexer 120 may search the printer database 130 for capable printers. The printer database 130 stores printer attribute data associated with various printers 140. For example, the printer attributes may include the location and type of the printer 140. The printer attributes may specify the minimum and maximum size of objects that may be printed on a printer 140. The attributes may define the types of materials the printer 140 utilizes for printing objects along with the current material quantity.

At block 420, a printability index 205 that defines the dimensional, structural, and material requirements determined above may be embedded into the file 200 associated with the object data 107.

At block 425, a report that specifies the attributes determined above may be generated. The report may list various printers 140 capable of printing the object defined by the object data 107. Where the object cannot be printed, the report may specify the reasons why, such as whether there are structural or material issues. Where the object is not printable for structural reasons, the report may specify those aspects of the object that are causing the problem. The report may be communicated back to the first user 105a so that the first user 105a can make corrections as necessary.

Returning to FIG. 3, at block 325 the file 200 is stored to the object database 125. This facilitates later access to the object data 107 stored in the file 200.

At block 330, the uniqueness of the object defined by the object data 107 may be assessed. Determination of the uniqueness of the object is best understood with reference to FIG. 5.

Figure 5:
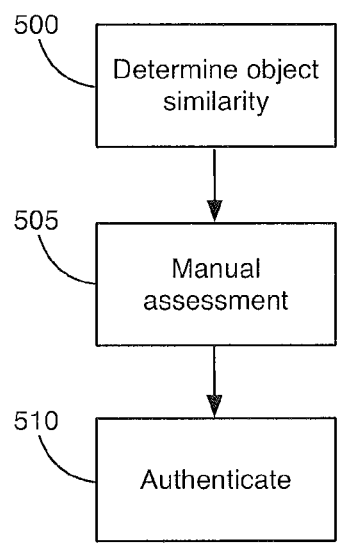
FIG. 5 illustrates a group of exemplary operations that facilitate determination of a uniqueness of the 3D object.

Turning to FIG. 5, at block 500 the new object defined by the object data 107 may be compared with object data for existing objects to determine how similar the new object is to existing objects. In this regard, the existing object data may comprise 3D object data for objects previously submitted to the system 100. In alternative embodiments, the existing 3D object data may be sourced from one or more third-party servers that store 3D object data.

Similarity may be determined by first analyzing the overall surface shape of the respective objects to determine the scale of the objects and the number of polygons of the objects. The density and other factors may also be considered. After comparison of these attributes, a similarity score that represents the similarity between new object and a given object that already exists is generated. To improve identification accuracy, the mesh sizes for the compared objects may be reduced to ensure that similar but lower resolution models are correctly compared.

At block 505, if the similarity score falls within a range at which the similarity cannot be automatically determined, the new object may be marked as requiring a manual assessment to determine how similar the object is to an existing object. If the similarity score is below a lower threshold, an automatic determination may be made that the new object is not similar to a given existing object. If the similarity score exceeds an upper threshold, an automatic determination may be made that the new object is similar to a given existing object.

At block 510, if the similarly score determined at step 500 or the manual assessment at block 505 indicates that the new object is unique, a certificate indicating the uniqueness of the object may be associated with the object. For example, a certificate of uniqueness may be embedded within the file 200 that stores the object data 107.

Determination of the uniqueness of the object may be a factor in determining whether there are intellectual property rights associated with the object that warrant protection. The uniqueness certificate may also provide a degree of comfort to others that may be modifying or printing the object that they are not infringing another's intellectual property rights when modifying or printing the object.

Figure 6:
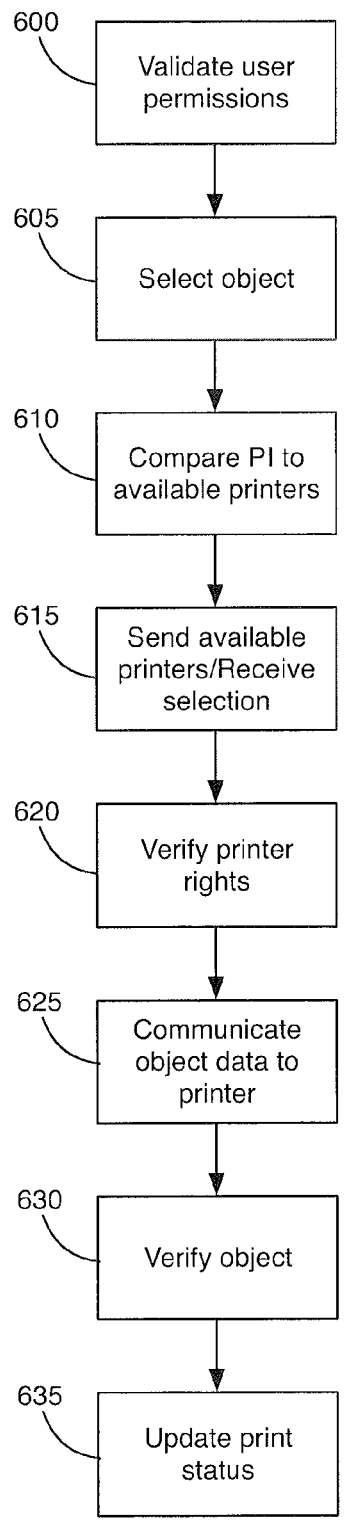
FIG. 6 illustrates a group of exemplary operations that may be performed when printing object data stored in an object database of the system.

FIG. 6 illustrates a block diagram of operations that may be performed when printing object data 107 stored in the object database 125. At block 600, an authentication web page may be presented to a second user 105b. The second user 105b may specify a user name and password. After validation of the second user 105b, the system 100 may search the object database 125 for any files 200 that have user rights 109 that authorize the second user 105b access to the object data 107 stored therein. For example, a list of files to which the second user 105b has access may be communicated to the second user 105b.

At block 605, a selection of one or more objects is received. For example, the second user 105b may select one or more objects for printing.

At block 610, the printability index for each object is compared with the printer attributes stored in the printer database 130 to identify one or more printers capable and available for printing of the object.

At block 615, a list of capable printers 140 is communicated to the second user 105b. The list may specify various attributes associated with each capable printer 140. For example, the location and type of each printer 140, the types of materials that each printer 140 utilizes, the cost associated with printing a given object on each printer 140, etc., may be communicated to the second user 105b. Other attributes may be provided. The second user 105b may select a printer 140 from the list of available printers.

At block 620, the printer rights 109 for the selected printer 140 are evaluated to determine whether the printer 140 has print rights to the object defined by the object data 107. For example, the printer controller 135 may analyze the printer rights 111 stored in the file 200 associated with the selected object to determine whether the time for printing the object has lapsed or whether the number of print attempts has exceeded the print attempt limit specified in the printer rights 111. Other rights may be evaluated to determine whether the printer 140 has the appropriate rights.

In an alternative implementation, the printer rights 111 may be confirmed for the selected object prior to block 615. In this case, the available printers communicated to the second user 105b would represented those printers 140 that are capable of printing the object defined by the object data 108, and which have the appropriate printer rights 111.

At block 625, if the printer rights 111 are confirmed at block 620, the object data 107 associated with the selected object is communicated to the selected printer 140 for printing. For example, the printer controller 135 may obtain the selected object data from the object database 125. The printer controller 135 then communicates the object data to a printer 140.

At block 630, the printed object may be verified. For example, a 3D scan of the object may be performed via an infrared or other type of 3D scanning. The operator/third party in control of the printer may perform the 3D scan. The scanned image data 144 may then be uploaded to the system 100. The printer controller 135 may then compare the scanned image data 144 to the original object defined by the object data 107 stored in the object database 125 to determine whether the printing results are successful. The results may be communicated back to the second user 105b and/or the printer 140 so that the appropriate actions may be taken.

At block 635, the print status of the file 200 associated with the object is updated. For example, the print attempt count in the printer rights 111 may be updated to reflect that a print attempt was made.

Figure 7:
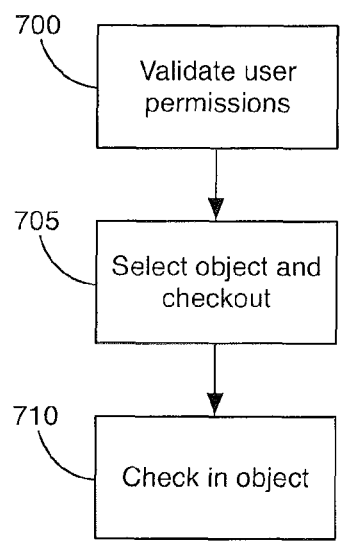
FIG. 7 illustrates a group of exemplary operations that may be performed when modifying object data stored in the object database.

FIG. 7 illustrates a block diagram of operations that may be performed when modifying object data 107 stored in the object database 125. At block 700, an authentication web page may be presented to a third user 105c. The third user 105c may specify a user name and password. After validation of the third user 105c, the system 100 may search the object database 125 for any files 200 that have user rights 109 that authorize the third user 105c access to the object data 107 stored therein. For example, a list of files to which the third user 105c has access may be communicated to the third user 105c.

At block 705, a selection of one or more objects is received. For example, the third user 105c may select one or more objects for modification. The selected object may be checked out for modification. For example, the object data 107 stored within the file 200 may be decrypted and communicated to the third user 105c. The third user 105c may modify the object defined by the object data 107 via any number of CAD programs.

At block 710, the modified data that defines the modified object data may be uploaded to the system 100 and stored back into the file 200. In some implementations, objects uploaded to the system 100 are version tracked, which may facilitate undoing changes made by a given user. In yet other implementations, the system 100 may represent the changes to the original object data 107 in terms of differences from the original object data 107. This simplifies version control and in some cases may result in decreased storage requirements for a given object.

In some instances, the object modified by the third user 105c may correspond to a stand-alone object. In other instance, the object modified by the third user 105c may be part of a larger assembly. In this regard, the first user 105a may have provided object data 107 for several objects of the assembly. The first user 105a may have restricted access to some of the objects via the user rights 109. For example, the user rights 109 on certain objects may be set to prevent modification of the object by other users 105c. The user rights 109 for other objects may have been set to allow modification. This facilitates customization of certain parts of the assembly. For example, a first user 105a may upload object data that defines a housing of some kind and a portion of the housing may be modifiable by others to place a logo on the housing.

Figure 8:
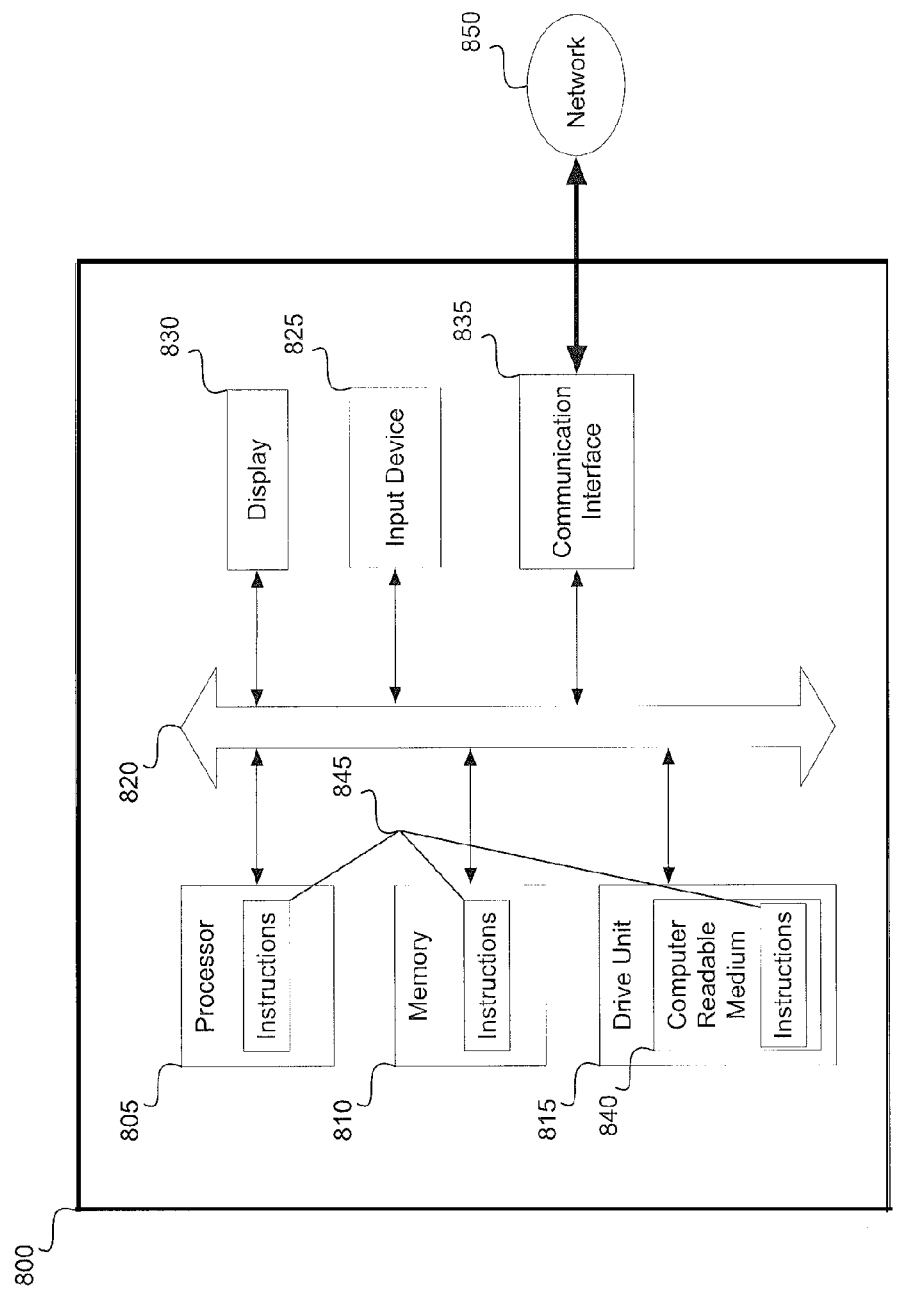
FIG. 8 illustrates a computer system 800 that may implement various modules of system.

FIG. 8 illustrates a computer system 800 that may form part of or implement the encryptor/wrapper 115 printability indexer 120, printer controller 120, uniqueness assessor 150, or any other module referenced herein. The computer system 800 may include a set of instructions 845 that the processor 805 may execute to cause the computer system 800 to perform any of the operations described above. The computer system 800 may operate as a stand-alone device or may be connected, e.g., using a network, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile device, capable of executing the instructions 845 (sequential or otherwise) that specify actions to be taken by that machine. Further, each of the systems described may include any collection of subsystems that individually or jointly execute a set, or multiple sets, of instructions to perform one or more computer functions.

The computer system 800 may include one or more memory devices 810 on a bus 820 for communicating information. In addition, code operable to cause the computer system to perform any of the operations described above may be stored in the memory 810. The memory 810 may be a random-access memory, read-only memory, programmable memory, hard disk drive or any other type of memory or storage device.

The computer system 800 may include a display 830, such as a liquid crystal display (LCD), a cathode ray tube (CRT), or any other display suitable for conveying information. The display 830 may act as an interface for the user to see the functioning of the processor 805, or specifically as an interface with the software stored in the memory 810 or in the drive unit 815.

Additionally, the computer system 800 may include an input device 825, such as a keyboard or mouse, configured to allow a user to interact with any of the components of system 800.

The computer system 800 may also include a disk or optical drive unit 815. The object database 125, printer database 130, and any other forms of storage referenced herein may be stored on the disk drive unit 815. The disk drive unit 815 may include a computer-readable medium 840 in which the instructions 845 may be stored. The instructions 845 may reside completely, or at least partially, within the memory 810 and/or within the processor 805 during execution by the computer system 800. The memory 810 and the processor 805 also may include computer-readable media as discussed above.

The computer system 800 may include a communication interface 835 to support communications via a network 850. The network 850 may include wired networks, wireless networks, or combinations thereof. The communication interface 835 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for routing object data that defines a three-dimensional (3D) object to a 3D printer, the method comprising:
   receiving, at a server, the object data;
   determining, by a printability indexer, object attributes associated with the 3D object defined by the object data, wherein the determined object attributes include a score that represents a structural integrity of the object, wherein determining the score further comprises determining one or more locations of the 3D object that are the thinnest and one or more angles at which surfaces converge;
   searching, by a printability indexer, a database that stores 3D printer attributes for one or more 3D printers capable of printing objects, wherein at least some of the one or more 3D printers are capable of printing objects having a first structural integrity score and other printers are incapable of printing objects having the first structural integrity score;
   if one or more capable printers are identified:
      communicating, by the server, a list that identifies the one or more capable 3D printers to a user;
      receiving, by the server, a printer selection that defines a 3D printer to which the object data is to be communicated; and
      communicating, by a printer controller, the object data file to the selected 3D printer to thereby facilitate printing the 3D object; and
   if no printers capable of printing an object having the first structural integrity score are identified, communicating, by the server, a report that indicates one or more aspects of the object attributes that are preventing a capable printer from being identified.

2. The method according to claim 1, further comprising:
   receiving, by the printer controller, scanned image data that corresponds to a scanned version of a printed object;
   comparing, by the printer controller, the scanned image data with the object data to determine whether the 3D object was successfully printed; and
   communicating, by the printer controller, a result of the comparison.

3. The method according to claim 1, wherein determining object attributes further comprises determining at least one of: dimensions of the 3D object, a structural integrity of the 3D object, and material requirements of the 3D object.

4. The method according to claim 3, further comprising generating a printability index for the 3D object that defines the determined at least one of: the dimensions of the 3D object, the structural integrity of the 3D object, and the material requirements of the 3D object.

5. The method according to claim 1, further comprising:
   receiving, by the server, rights data that defines at least one of: user rights and printer rights.

6. The method according to claim 5, wherein the user rights define at least one of: a number of times a user can access the object data, a user's ability to read the object data, a user's ability to modify the object data, a user's ability to download the object data, a user's ability to distribute the object data to other users, and a user's ability to source the object data to a printer.

7. The method according to claim 5, wherein the printer rights define at least one of: an ability by a printer to access the object data, a definition of printers upon which the object can be printed, a set duration or time at which access to the object data will expire, and a print-attempt count that corresponds to a maximum number of times an attempt to print the object can be made.

8. The method according to claim 5, wherein the object data is encrypted and encapsulated within a file wrapper, wherein the wrapper file includes metadata that defines the user rights and the printer rights.

9. A system for routing object data that defines a three-dimensional (3D) object to a 3D printer, the system comprising:
- a server configured to receive the object data;
- a subsystem configured to:
  - determine object attributes associated with the 3D object defined by the object data, wherein the determined object attributes include a score that represents a structural integrity of the object, wherein in determining of the score by the subsystem the subsystem is configured to determine one or more locations of the 3D object that are the thinnest and one or more angles at which surfaces converge, and
  - search a database that stores 3D printer attributes for one or more 3D printers capable of printing objects, wherein at least some of the one or more 3D printers are capable of printing objects having a first structural integrity score and other printers are incapable of printing objects having the first structural integrity score; and
  - wherein the server is further configured to communicate a list that identifies the one or more capable 3D printers to a user and receive a printer selection that defines a 3D printer to which the object data is to be communicated when one or more capable printers are identified by the subsystem, communicate a report that indicates one or more aspects of the object attributes that are preventing a capable printer from being identified when no printers capable of printing an object having the first structural integrity score are identified; and
- a printer controller configured to communicate the object data file to the selected 3D printer for printing when one or more capable printers are identified by the subsystem to thereby facilitate printing the 3D object.

10. The system according to claim 9, wherein the printer controller is further configured to:
- receive scanned image data that corresponds to a scanned version of a printed object;
- compare the scanned image data with the object data to determine whether the 3D object was successfully printed; and
- communicate a result of the comparison.

11. The system according to claim 9, wherein the subsystem is further configured to determine at least one of: dimensions of the 3D object, a structural integrity of the 3D object, and material requirements of the 3D object.

12. The system according to claim 11, wherein the subsystem is further configured to generate a printability index for the 3D object that defines the determined at least one of: the dimensions of the 3D object, the structural integrity of the 3D object, and the material requirements of the 3D object.

13. The system according to claim 9, wherein the server is further configured to receive rights data that defines at least one of: user rights and printer rights.

14. The system according to claim 9, wherein:
- the user rights define at least one of: a number of times a user can access the object data, a user's ability to read the object data, a user's ability to modify the object data, a user's ability to download the object data, a user's ability to distribute the object data to other users, and a user's ability to source the object data to a printer; and
- the printer rights define at least one of: an ability by a printer to access the object data, a definition of printers upon which the object can be printed, a set duration or time at which access to the object data will expire, and a print-attempt count that corresponds to a maximum number of times an attempt to print the object can be made.

15. A non-transitory machine-readable storage medium having stored thereon a computer program comprising at least one code section for routing object data that defines a three-dimensional (3D) object to a 3D printer, the at least one code section being executable by a machine for causing the machine to perform acts of:
- receiving the object data;
- determining object attributes associated with the 3D object defined by the object data, wherein the determined object attributes include a score that represents a structural integrity of the object, wherein determining the score further comprises determining one or more locations of the 3D object that are the thinnest and one or more angles at which surfaces converge;
- searching a database that stores 3D printer attributes for one or more 3D printers capable of printing objects, wherein at least some of the one or more 3D printers are capable of printing objects having a first structural integrity score and other printers are incapable of printing objects having the first structural integrity score;
- if one or more capable printers are identified:
- communicating a list that identifies the one or more capable 3D printers to a user;
- receiving a printer selection that defines a 3D printer to which the object data is to be communicated; and
- communicating the object data file to the selected 3D printer to thereby facilitate printing the 3D object; and
- if no printers capable of printing an object having the first structural integrity score are identified, communicating a report that indicates one or more aspects of the object attributes that are preventing a capable printer from being identified.

\* \* \* \* \*